Oct. 24, 1961 A. E. GERSCH 3,005,951
WIDE SCALE ELECTRICAL MEASURING INSTRUMENT
Filed April 29, 1957 4 Sheets-Sheet 1
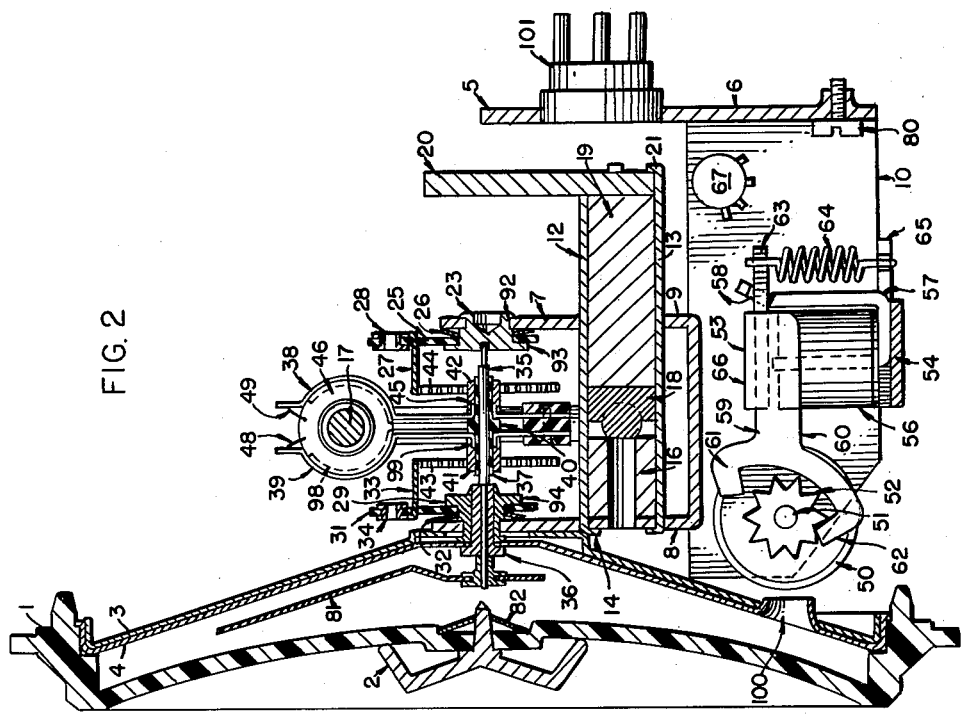
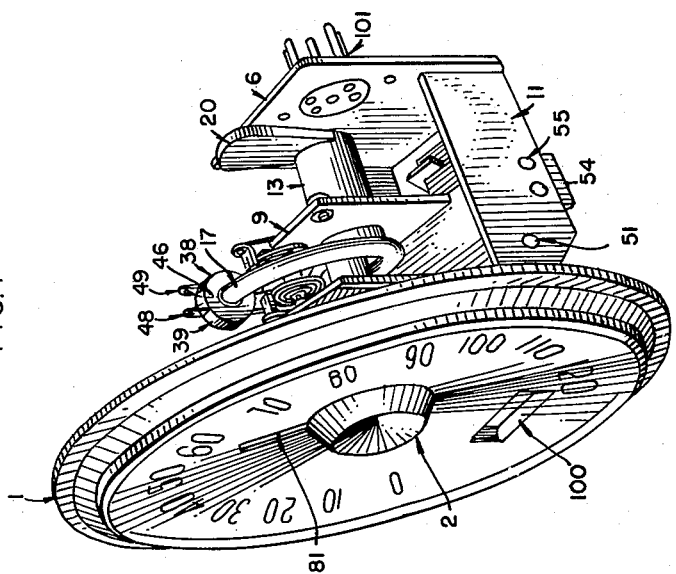
INVENTOR:
ADOLPH E. GERSCH
BY John C. Black
ATT'Y

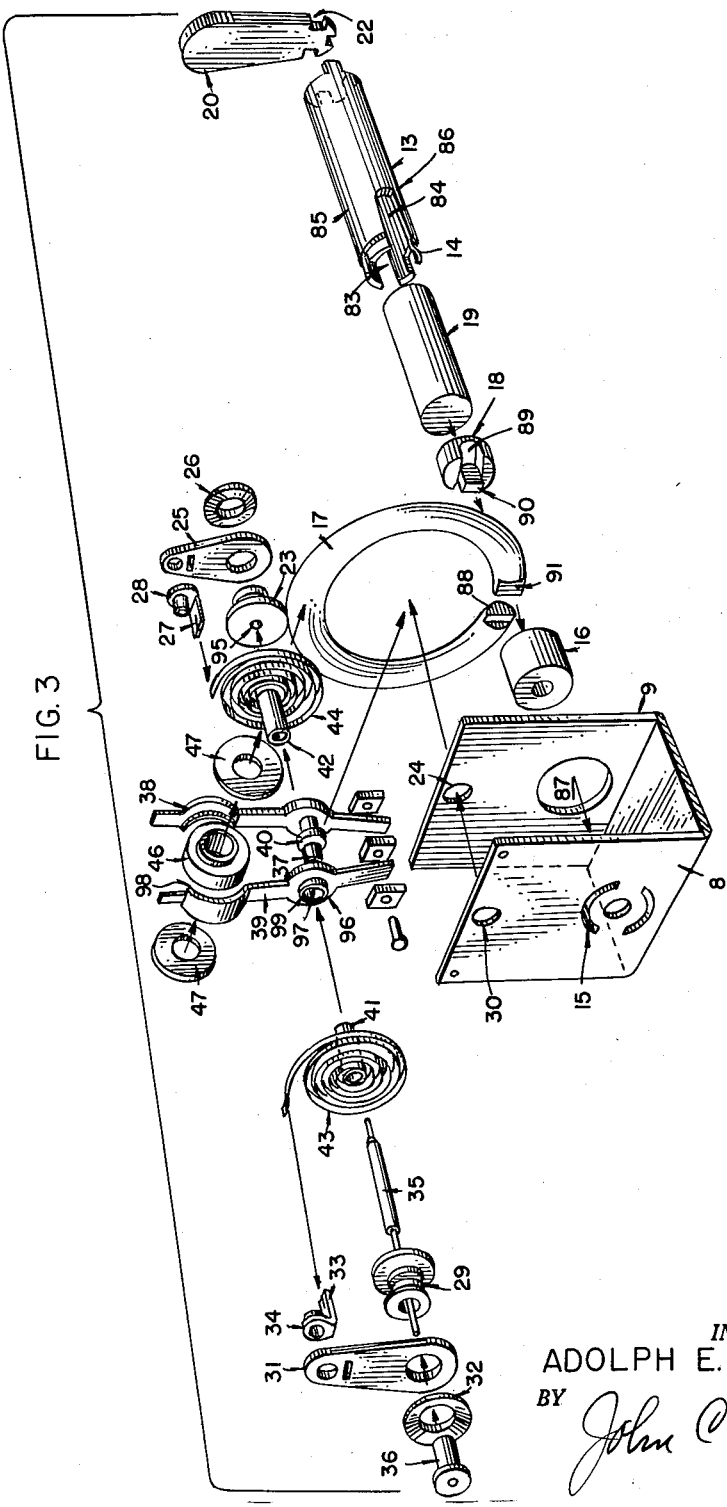

Oct. 24, 1961     A. E. GERSCH     3,005,951
WIDE SCALE ELECTRICAL MEASURING INSTRUMENT
Filed April 29, 1957     4 Sheets-Sheet 3

INVENTOR:
ADOLPH E. GERSCH
BY
John C. Black
ATT'Y

*INVENTOR:*
ADOLPH E. GERSCH
BY
ATT'Y

United States Patent Office 3,005,951
Patented Oct. 24, 1961

3,005,951
WIDE SCALE ELECTRICAL MEASURING
INSTRUMENT
Adolph E. Gersch, Chicago, Ill., assignor to Stewart-Warner Corporation, Chicago, Ill., a corporation of Virginia
Filed Apr. 29, 1957, Ser. No. 655,904
8 Claims. (Cl. 324—150)

This application relates generally to electrical measuring instruments and more particularly to low cost instruments of the wide scale type.

Although the present invention has been found to be particularly adaptable for use as an electric speedometer or tachometer, which two products commercially require low cost together with wide scale indication, it will be apparent from the following discussion that the invention herein can advantageously be utilized in the instrument and meter fields; and, therefore, it is to be understood that although the description herein will cover its application to the speed indicating art, the invention is not to be limited thereby.

In the past, innumerable attempts have been made to provide a commercially acceptable electric speedometer and/or tachometer. In certain instances where cost was of no consideration very elaborate and expensive electric tachometers have been commercially introduced with some degree of success; but not even the slightest commercial consideration can be given to these expensive tachometers for use in the conventional vehicle speedometer and tachometer applications where very low cost is a primary consideration.

In the conventional speedometer and tachometer applications no fully electric device has to date seriously challenged the standard magnetic speedometer (e.g., U.S. Patent 2,141,455) which is mechanically driven. This is so even though the trend in the vehicle instrument field has been, for several reasons, to make all of the instruments electrically operated whereby only wiring need connect the instruments with appropriate selectively controlled sending units. Several attempts were made to utilize a moving iron vane-type instrument as the speed responsive indicator, for example Le Fevre et al. Patent 2,159,333. Various other approaches have been tried, such as a conventional magnetic speedometer driven with a synchronous motor electrically connected to a mechanically driven generator as in Wargo Patent 2,649,559, an electrically driven differential torque frequency meter as in Petroff Patent 2,666,180 and a magnetic speedometer in which the eddy current drag speed cup is angularly displaced by a series of polyphase field windings electrically connected to a polyphase electrical generator as in Norman Patent 2,339,743 (instead of being displaced by a mechanically rotated permanent magnet). In all of these attempts, one or more of the primary prerequisites for a vehicle speed responsive indicating system was lacking—e.g., low cost, wide uniform scale, satisfactory compatible sending and receiving units.

Because of the above requirements, no serious commercial effort appears to have been made to utilize the moving coil type galvanometer movement as the speed responsive indicating element in a commercially acceptable vehicle application, the brief résumé of this art set forth below explains why it did not appear feasible to utilize this principle in the vehicle field.

The modern instrument art had its beginning with Oersted's discovery of the galvanometer principle in 1819. The art was advanced by the notable contributions of Thomson, Pouillet and Sturgeon, culminating in 1882 (by the addition of "properly shaped pole pieces") in the D'Arsonval galvanometer. In each of these early developments, the meter movement was limited to a rather small angular scale somewhat below 90°. Indeed, this short scale movement, even today at this advanced stage in the art, still predominates in the galvanometer type instrument field, especially where low cost or accuracy is desired.

Toward the end of the nineteenth century, a new approach to the moving coil type meter was discovered, which general approach, though greatly improved upon, is still the basis for the modern commercial wide scale instruments. In this mode of operation, two concentric pole pieces have adjacent annular spaced surfaces describing an arc generally about 270°, with the inner pole piece being formed to receive a coil therearound which can rotate through said 270° with one side of the coil moving in the annular air gap between said adjacent edges of the pole pieces. This construction necessitates an expensive pole piece arrangement with accurately machined pole faces and nearly perfect symmetrical mounting. It has been universally believed necessary to maintain minimum distances between the adjacent surfaces of the pole piece for sensitivity; however, this narrow spacing has prevented the use of coils of any appreciable size. Also, only a small part of the coil is effective. Throughout the course of research and engineering in this wide scale meter field, the basic philosophy of the D'Arsonval discovery has always seemed to predominate—i.e., the moving coil element must be moved through a field of magnetic flux formed by two symmetrically disposed closely spaced pole pieces giving rise therefore to uniform flux density along the path of coil movement.

Neither of the above types of moving coil meters have been acceptable for commercial use in the speed indicator art, the former because of a short scale and the latter because of prohibitive cost.

In his search for an electrical indicating instrument which would be suitable as the indicating component of a speed indicating device, the inventor herein happened upon a radically new approach to electric measuring instrumentation. It has been discovered that, when a pole piece of any configuration is disposed in contact with or intimately adjacent to one pole of a magnet (and therefore magnetically influenced to an appreciable extent by said one pole) and is disposed remotely from the other pole of said magnet, a coil having restoring bias can be mounted around said pole piece to give substantially uniform movement in response to varying current passed through the coils even though the pole piece is not symmetrical with either magnetic pole, and apparently irrespective of the shape or precise positioning of the pole piece. A few of the configurations which are so adapted to substantially linear wide scale movement are shown in the drawings herein. Because of this discovery, it now appears that a linear, wide scale electrical instrument sufficiently low in cost for application to the speedometer art has been realized. It is apparent at first glance that, inasmuch as only one pole piece is necessary, there are no expensive machining or symmetrical mounting problems involved and that coil size is no longer severely restricted as in former instruments.

Without being bound thereby, the following theory of operation is offered as the probable explanation of the results obtained.

Test equipment indicates that an elongated pole piece secured to or adjacent to one pole of a magnet and remote from the other pole emits radial leakage flux substantially uniform along a substantial portion of its length. An electrically energized coil surrounding said pole piece produces a magnetic field at right angles to the leakage flux. The interaction of the two magnetic fields produces a force at right angles to said fields to cause the coil to move along the length of the pole piece until the force due to the interaction of the fields is opposed by an equal and opposite force from a biasing spring operatively secured to the coil.

According, it is a primary object of the present invention to provide a new and improved electrical measuring instrument.

Another primary object of the present invention is to provide a new and improved wide scale electrical measuring instrument.

Another primary object of the present invention is to provide a new and improved substantially uniform, wide scale electrical measuring instrument.

Another primary object of the present invention is to provide a new and improved substantially uniform, wide scale, electrically operated indicator.

Another primary object of the present invention is to provide a new, low cost magnetic flux path assembly for a meter.

A further primary object of the present invention is to provide a new and improved substantially uniform, wide scale electric speed indicating device.

A feature of the present invention is the provision of a substantially uniform, wide scale meter having only one pole piece.

Another feature of the present invention is the provision of inexpensive, magnetic flux directing means for providing an improved scale and sensitivity.

Another feature is the provision of inexpensive magnetic flux directing means for altering the meter response in desired isolated sections of the scale.

Other objects and features will be evident upon a perusal of the following description in which:

FIG. 1 shows a perspective view of one embodiment of the invention;

FIG. 2 shows an elevation view, partially in section, of the embodiment shown in FIG. 1;

FIG. 3 shows an exploded view of the moving coil meter portion of said embodiment;

Figure 4:
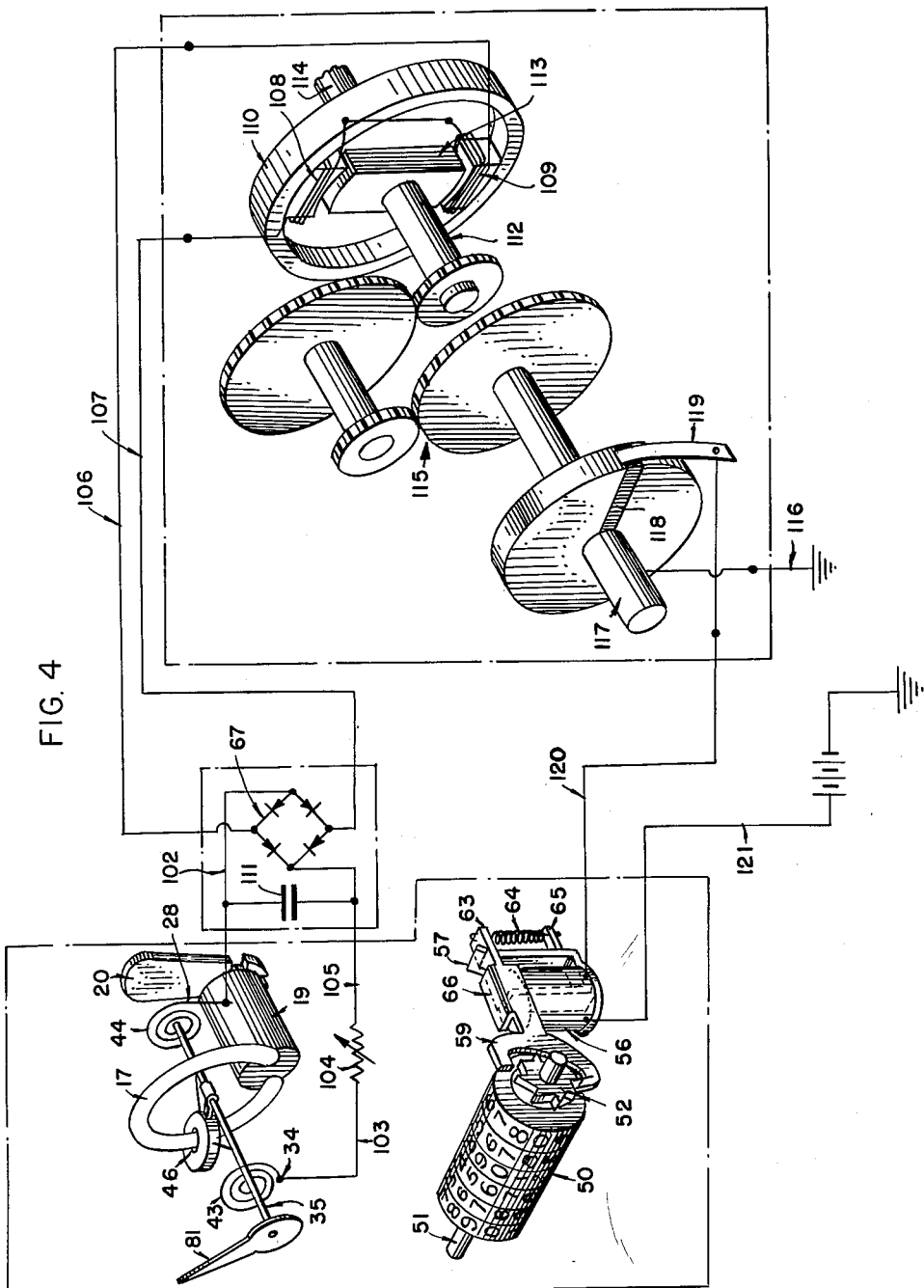
FIG. 4 shows a schematic circuit diagram of a speed indicating device incorporating the embodiment shown in FIG. 1.

In general, a speed indicating system is provided wherein an A.C. generator produces a current proportional to the speed, a rectifier and capacitor rectify and filter the current and a wide scale moving coil meter movement operated by said current provides a continuous indication of instantaneous speed. An electromagnetically operated odometer is also provided.

With particular reference to FIGS. 1, 2 and 3, the first embodiment comprises a transparent face dial 1 (FIG. 2) which is rigidly mounted in any well-known manner in a conventional, generally cup-shaped case (not shown), which case is mounted on a vehicle in a well-known manner. A medallion 2 is secured to the face dial 1 by means of a lock nut 82. A truncated conical background assembly 3, including a subdial surface 4, is disposed behind and coaxially with said face dial 1, said background assembly 3 being held in place between the face dial 1 and the speedometer mechanism to be described below by screws (not shown) securing said assembly to the speedometer mounting bracket assembly 7. A rotatable pointer 81 is selectively moved across a fixed scale (FIG. 1) on the background assembly 3 to give a continuous instantaneous indication of speed.

The speed indicating mechanism will now be described in detail. A frame 5 (FIG. 2) comprises a rear vertically disposed plate 6, which is secured to the abovesaid case by screws 80, and a mounting bracket assembly 7, which latter assembly includes a U-shaped section having vertically disposed legs 8 and 9 and a pair of vertically disposed legs 10 and 11 (FIG. 1) extending downwardly from either side of legs 8 and 9 and perpendicular thereto. The plate 6 (FIG. 2) and the bracket assembly 7 are preferably formed from nonferrous sheet metal, for example, aluminum, and are secured together near the lower outer edges of plate 6 in any conventional manner, for example, by welding.

A generally cylindrical magnet assembly 12 is rigidly secured near the bottom of and perpendicular to legs 8 and 9. A thin wall cylinder 13 (FIG. 3) of a nonferrous material has at one end thereof diametrically opposed longitudinal slots 83 and 84 (for receiving ring 17) describing a pair of arcuate projections 85 and 86 which project through arcuate opening 15 in leg 8. Four spaced, necked down projections, provided at the free ends of projections 85 and 86, are rolled over the outer surface of leg 8. Disposed within cylinder 13 are a cylindrical spacer 16 (FIG. 2), the lower portion of an annular soft iron ring 17, a soft iron clamp 18 and a permanent magnet 19, which magnet is polarized axially. A flat elongated soft iron trimmer 20 is vertically secured to the opposite end of the cylinder 13 by means of three projections 21 on cylinder 13 and matching key slots 22 in the lower portion of trimmer 20, said projections being rolled over the lower portion of trimmer 20 to rigidly secure the above described components within the magnet assembly 12 and to rigidly secure said assembly to leg 8.

To assemble said magnet assembly 12, the cylinder 13 is inserted through aperture 87 (FIG. 3) in leg 9, the magnet 19, clamp 18, ring 17 and spacer 16 are then inserted in cylinder 13 in that order. Projections 85 and 86 are then inserted through apertures 15, trimmer 20 is assembled in place and finally the projections 14 are rolled over to rigidly secure the assembly. The ring 17 has a gap 88 cut away at its lower central portion to permit a coil 46 to be placed thereon (prior to the above assembling of magnet assembly 12). The clamp 18 has spaced arcuate grooves 89 adapted to receive the lower righthand portion of ring 17. A generally rectangular central projection 90 between grooves 89 is press fit into the gap 88 in ring 17. It is noted that a good magnet circuit is thereby provided between magnet 19, clamp 18 and ring 17.

The left-hand surfaces 91 of ring 17 on either side of gap 88 are made flat to tightly engage the right-hand surface of spacer 16 thereby to prevent tilting of ring 17 about its confined lower portion. Projection 90 and slots 83 and 84, respectively, prevent rotation and transverse misalignment of ring 17.

A moving coil assembly is mounted near the upper free ends of bracket legs 8 and 9 (FIG. 2). An annular hub 23 is secured to the upper portions of leg 9 by pressing its necked down portion 92 into the aperture 24 (FIG. 3) in leg 9 and rolling the edge over. A spring anchor insulator 25 (FIG. 2) is pressed on the hub 23 and is held in position against hub flange 93 by a lock spring 26. A metallic spring anchor 27 is secured to the upper end of the spring anchor insulator 25 by means of its eyelet 28. An annular hub 29 is pressed through an aperture 30 (FIG. 3) near the upper end of leg 8 and turned over to provide a rigid mounting coaxial with the hub 23. A spring anchor insulator 31 (FIG. 2) is pressed on hub 29 and held against hub flange 94 by lock spring 32. A spring anchor 33 is rigidly secured to the upper end of insulator 31 by means of its eyelet 34. A tension adjusting screw 36 is rotatably mounted within the axial bore of the hub 29. A shaft 35 (coaxial with ring 17) is pressed in an axial bore in the adjusting screw 36 and is pivoted in an axial bore 95 (FIG. 3) in the hub 23. An annular insulator 37 (FIG. 2) is pressed on (or molded on) the shaft 35. Said insulator 37 has an annular shoulder 40 at the center thereof. A pair of coil mounting brackets 38 and 39 are pressed on said insulator 37 on either side of said shoulder 40. Said bracket 39, formed from thin spring stock, is elongated with a circular enlarged portion 96 (FIG. 3) intermediate the ends thereof. Said portion 96 has a bore 97 therein and a coaxial extruded hub 99 which fits tightly around the insulator 37 (FIG. 2). A substantial part of each side of bracket 39 is bent inwardly to form projections 98. The bracket 38 is identical to bracket 39, but is rotated 180°. A pair of hairsprings 43 and 44, with metallic bushings 41 and 42, respectively, are pressed upon the shaft insulator 37 from opposite ends, said bushings 41 and 42 having counterbores at their inner adjacent ends so that said ends can be forced over the extruded hubs 99 and 45 of coil mounting brackets 39 and 38 respectively to hold said brackets securely against the shoulder 40 of insulator 37. The outer free ends of hairsprings 43 and 44 are soldered respectively to the spring anchors 33 and 27.

An electromagnetic coil 46 having flat annular insulating discs 47 (FIG. 3) on either side thereof is held firmly between the two mounting brackets 38 and 39 (confined by projections 98) so that it is concentric with and spaced from the soft iron ring 17 in all operational positions of coil 46. The two ends 48 and 49 of the insulated wire comprising coil 46 are electrically connected to the upper free end of the two mounting brackets 39 and 38 respectively, for example, by soldering. It can be seen, therefore, that the electrical circuit for the coil 46 extends from spring anchor 27, through spring 44, bushing 42, bracket 38, coil 46, bracket 39, bushing 41 and spring 43 to spring anchor 33. A pointer 81 is secured to the shaft 35 in a well-known manner.

An electromagnetically operated odometer assembly 50 (FIG. 2) is mounted on a shaft 51, which shaft is rotatably mounted on and perpendicular to legs 10 and 11 of frame 5. Said odometer 50 may be of any type well-known in the art. A ratchet wheel 52 is pressed on shaft 51 and rotates therewith. An electromagnet 53 for actuating the odometer 50 is rigidly secured to a U-shaped nonmagnetic metallic mounting strip 54, which strip is in turn rigidly secured to legs 10 and 11 by means of mounting screws 55 (FIG. 1). Said electromagnet 53 comprises a coil 56 (FIG. 2), a generally U-shaped soft iron core 57, having a generally rectangular aperture 58 near the upper end of the right-hand leg and an armature 59 which extends through the core aperture 58, is pivoted on the lower edge of said aperture 58 and is urged in a clockwise direction about said pivot by a spring 64 secured to the right-hand end of armature 59 and to a projection 65 at the lower end of the core 57. Said armature 59 comprises a nonmagnetic member 60 with a generally crescent shaped left-hand segment defining a pawl 61 and a detent 62 and with an upper right-hand projection 66 bent over to a horizontal position for rigid connection with a horizontally disposed, generally rectangular segment 63 of soft iron. An elongated rectangular aperture 100 is provided in the background assembly 3 through which the odometer reading may be observed. A generally cylindrical multiunit rectifier 67 is secured to the upper right-hand section of frame leg 10. A conventional electrical plug 101 is rigidly secured to plate 6 in any well-known manner.

The circuit for coil 46 has been traced above from the eyelet 28 to the eyelet 34. With particular reference to FIG. 4, it will be seen that the circuit for coil 46 is extended from the eyelets 28 and 34 to the D.C. side of the full-wave rectifier 67 by way of conductor 102 and by conductor 103, rheostat 104 and conductor 105. A capacitor 111 is also connected across the D.C. side of the rectifier 67 to filter the current pulses. The A.C. side of the rectifier 67 is connected by way of conductors 106 and 107 to the series connected stator windings 108 and 109 of a conventional A.C. generator 110. A rotor 112 of the A.C. generator 110 comprises a permanent magnet 113 and a shaft 114 which is driven in a well-known manner by the rotating element (not shown), the speed of which is to be measured. The shaft 114 also drives a reducing gear train 115, which gear train causes ground potential to be extended over conductor 116, shaft 117, conducting surface 118, contact 119, conductor 120, the odometer magnet coil 56 and conductor 121 to battery potential once every predetermined distance travelled (for example, one-tenth of a mile) to step the odometer ratchet wheel 52 one step.

The A.C. generator 110 will produce a voltage in the stator windings 108 and 109 proportional to the speed of rotor 112. Said voltage will cause a current to flow in the above described circuit for coil 46. Said current is rectified by rectifier 67 and applied to the coil 46. The coil 46 will in turn be displaced angularly in proportion to the current due, it is believed, to the torque produced by the interaction of the magnetic field of the energized coil 46 and the magnetic flux leakage from ring 17. It will be noted that the capacitor 111 is not always necessary in various differing designs, for example where more than two stator windings and magnet poles are used in generator 110. The rheostat 104 has been shown as one possible method for calibrating the meter. However, the more conventional calibrating method of fixing the magnet strength and adjusting the hairspring tension may be used. In this latter method, the magnet is overmagnetized, and then demagnetized gradually until proper calibration is effected.

Figure 5:
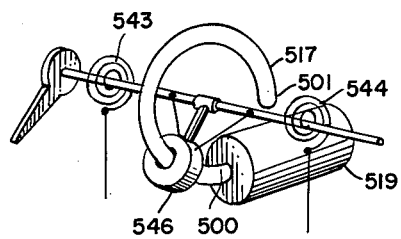
FIGS. 5, 6, 7 and 8 show various modifications of the embodiment shown in FIG. 1.

FIG. 5 shows diagrammatically a modification of the invention. The meter movement comprises an axially polarized permanent magnet 519, a split annular ring 517 with one free end of the ring adjacent the central portion of one pole of the magnet 519, the other free end of the ring 517 being disposed in close proximity to, but not touching, a portion of the periphery of the magnet 519 intermediate the two poles. A pivoted coil 546 is mounted for movement around the ring 517. Biasing springs 543 and 544 are provided for coil 546. It has been discovered that this construction also provides a substantially uniform scale over a substantial portion of the ring 517 (approximately 270°). It was also discovered that by moving the free end 500 of the ring 517 closer or further away from the adjacent magnet pole of magnet 519, but preferably no further away than one-twentieth of an inch, the sensitivity of the meter movement could be adjusted for calibration purposes. This is true of the other embodiments shown herein when the ring is properly mounted for such adjustment. It has further been noted that the other free end 501 of ring 517 is disposed as close to but not touching the outer periphery of magnet 519, preferably less than one-fourth inch and preferably no closer to either magnetic pole of magnet 519 than one-fourth of the distance between poles. Disposition of the free end 501 will, of course, have some affect upon sensitivity of the meter movement. The minimum distance between the free end 501 and the periphery of the magnet 519 may, due to assembly problems, be determined by clearance required to thread pole piece 517 through coil 546.

Figure 6:
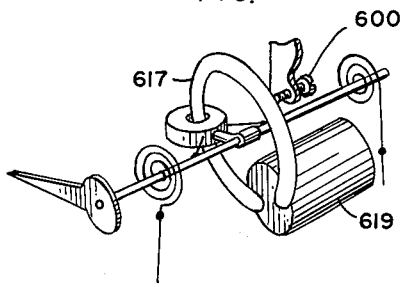

FIG. 6 shows diagrammatically another modification of the preferred embodiment and differs from the preferred embodiment by the elimination of the soft iron trimmer, such as trimmer 20 of FIG. 3. It has been found that a construction such that as that shown in FIG. 6 provides a substantially uniform scale over a considerable portion of the scale (240° or better); however, a trimmer such as trimmer 20 of FIG. 3 improves the scale uniformity and further increases the usable portion of the scale (as much as 300°). It has also been discovered that the sensitivity of individual portions of the scale may be increased with accurate control by the simple expedient of mounting a soft iron element 600 (FIG. 6) in the magnetic path between that portion of the ring 617 desired to be so affected and the right-hand end of magnet 619. This causes a greater amount of magnet flux leakage from the desired section of ring 617 without noticeably affecting flux leakage from other sections. This can be especially useful in the indicator art when a nonuniform portion of a scale may be desired or when a uniform scale is desired with a nonuniform sending unit. For example in a given speedometer design, should it be impossible due to cost to use an A.C. generator 110 (FIG. 4) with a current output uniformly proportional to the speed of its armature throughout the entire desired range, it may be necessary to utilize a less expensive generator with a less uniform current response in a limited portion of the range; then a properly disposed soft iron flux directing element such as 600 (FIG. 6) can be used to compensate (within limits) for the nonuniformity of the generator 110 (FIG. 4). Also, the trimmer 20 (FIG. 3) can be shaped to increase sensitivity in any section of ring 17 to compensate for nonuniformity of generator 110 (FIG. 4) by the simple expedient of a projection extending outwardly opposite said section to shorten the flux path for said section.

It can be seen, therefore, that the meter movement lends itself to low cost, mass production techniques. Conventional meters do not lend themselves to such techniques and require expensive, special pole piece structures to alter the normal movement.

Figure 7:
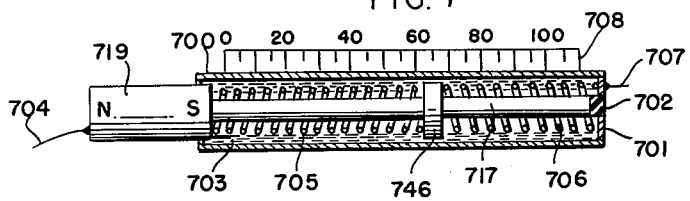

FIG. 7 shows diagrammatically another modification of the present invention whereby a straight-line scale instead of an angular scale is provided. Secured in sealing relation to an axially polarized magnet 719 is a transparent cylindrical plastic tube 700 which is sealed at its opposite end by means of an annular metallic disc 701 and a nonmetallic insulating plug 702. The tube 700 is filled with a transparent liquid 703. A soft iron pole piece 717 is rigidly secured between the magnet 719 and the plug 702 coaxially within the tube 700. A coil 746 carried by an integral float is disposed about the pole piece 717 and has a specific gravity substantially equal to that of the liquid 703. The circuit for coil 746 may be traced from conductor 704 through the magnet 719, a biasing spring 705, coil 746, a second biasing spring 706 and the metallic disc 701 to conductor 707. The coil 746 is normally held by spring 705 and 706 below the zero mark on the scale 708 above tube 700 when no current is passing therethrough. Current passed through coil 746 will flow in such a direction as to cause axial displacement from left to right (with respect to FIG. 7), the displacement being substantially uniform in proportion to current passing therethrough over a substantial length of pole piece 717. The two extreme ends of pole piece 717 are not usable, presumably because of excessive flux leakage at said ends.

Figure 8:
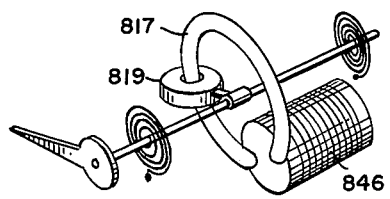

FIG. 8 shows diagrammatically another embodiment of the invention in which a small, annular, axially magnetized, biased permanent magnet 819 is pivoted to move around a soft iron ring 817 and in which a stationary iron core coil 846 is provided for connection with the current source to be measured. The overall operation is substantially the same as that of the other embodiments except that the disposition of the permanent magnet and the coil is reversed. Because the magnet is weaker than in other embodiments, the ampere-turns of the coil 846 must be greater than in other embodiments.

While there has been described what at present is believed to be in the preferred embodiments of the present invention, it will be understood that various changes and modifications may be made therein; and it is contemplated to cover in the appended claims all such changes and modifications as fall within the true spirit and scope of the invention.

What is claimed is:

1. A substantially uniform, wide scale electric meter movement comprising: a coil; a permanent bar magnet; an elongated first ferromagnetic element rigidly secured to one end of said magnet and extending therefrom in transverse relation; a generally annular pole piece having an opening in one circumferential portion thereof to permit assembly of said coil about the pole piece; the pole piece having a substantially uniform cross-section and being substantial in mass relative to the magnet; means including a second ferromagnetic element closing the opening in said pole piece and magnetically connecting said pole piece to the other end of said magnet; means supporting said pole piece generally opposite, parallel with and physically remote from said first ferromagnetic element to provide a relatively high reluctance magnetic path therebetween, whereby a generally uniform, radial magnetic flux leakage is produced along a substantial circumferential length of said pole piece; means, including a shaft coaxial with the axis of said annular pole piece, pivotally supporting said coil for rotational movement along said substantial circumferential length of the pole piece; and biasing means for said coil.

2. A substantially uniform, wide scale electric instrument comprising a straight permanent magnet; a coil; a generally annular pole piece having an opening to permit threading of the pole piece through said coil; the pole piece having a substantially uniform cross-section and being substantial in mass relative to the magnet; magnetic structure engaging one pole of said magnet and said pole piece providing a low reluctance magnetic circuit therebetween and closing said pole piece opening; mounting means rigidly securing said pole piece, magnetic structure and magnet rigidly together with said pole piece disposed about an axis parallel and noncoaxial with the axis of said magnet; means including a shaft coaxial with the axis of said annular pole piece pivotally supporting said coil for rotational movement along the circumferential length of said pole piece; at least one biasing spring secured rigidly to said shaft; means secured to the free ends of said spring preventing movement thereof; a stationary scale; a pointer rigidly secured to said shaft and cooperating with said scale to provide instrument readings; and an elongated element of a magnetic material rigidly secured to the other pole of said magnet, disposed substantially parallel with the pole piece, and including a curved outer end opposite the central portion of said pole piece.

3. For use in substantially uniform, wide scale, moving coil instrument, a permanent magnet flux path assembly comprising: a straight, elongated permanent bar magnet polarized in the direction of its elongation; an elongated first ferromagnetic pole piece; means rigidly securing said pole piece in magnetic conducting relationship with one pole of said magnet with said pole piece extending therefrom in tranverse relation; a generally annular second ferromagnetic pole piece having a circumferential gap to permit a coil to be threaded thereon; the second ferromagnetic pole piece having a substantially uniform cross-section and being substantial in mass relative to the magnet; means securing said second ferromagnetic pole piece in magnetic conducting relationship with the other pole of said magnet with said second ferromagnetic pole piece extending from said other pole generally opposite to, parallel with and remote from said first ferromagnetic pole piece to provide a high reluctance air gap path between said ferromagnetic elements, the first ferromagnetic pole piece including an arcuate outer end disposed generally opposite the outer central portion of the second ferromagnetic element, whereby a generally uniform, radial flux leakage is produced along a substantial circumferential length of said second ferromagnetic pole piece.

4. A substantially uniform, wide scale electric meter movement comprising: a permanent bar magnet; a substantially flat, elongated first ferromagnetic element rigidly secured to one end of said magnet and having a rounded end extending in transverse relation therefrom; a generally annular pole piece having a substantially uniform cross-section and being substantial in mass relative to the magnet; means for magnetically connecting said pole piece to the other end of said magnet and supporting said piece generally opposite, parallel with and physically remote from said first ferromagnetic element to provide a relatively high reluctance air gap path therebetween, whereby a generally uniform, radial magnetic flux leakage is produced along a substantial circumferential length of said pole piece; a coil encircling said annular pole piece; means, including a shaft coaxial with the axis of said annular pole piece, pivotally supporting said coil for rotational movement along the substantial circumferential length of the pole piece; and biasing means for said coil.

5. A substantially uniform, wide scale electric meter movement comprising: a permanent bar magnet; first ferromagnetic pole piece rigidly secured to one end of said magnet and extending in transverse relation therefrom; a generally annular pole piece having a substantially uniform cross-section and being substantial in mass relative to the magnet; means for magnetically connecting said pole piece to the other end of said magnet and supporting said pole piece generally opposite, parallel with and physically remote from said first ferromagnetic element to provide a relatively high reluctance air gap path therebetween, whereby a generally uniform, radial magnetic flux leakage is produced along a substantial circumferential length of said pole piece; a coil encircling said annular pole piece; means including a shaft coaxial with the axis of said annular pole piece pivotally supporting said coil for rotational movement along said substantial circumferential length of the pole piece; and biasing means for said coil.

6. A substantially uniform wide scale electric meter movement comprising a substantially straight bar magnet, an annular pole piece having a substantial mass in relation to said magnet and a substantially uniform cross-section magnetically coupled to one pole of said magnet and lying within a plane perpendicular to the direction of polarization of the magnet at said one pole, said annular pole piece and the other pole of said magnet defining an air gap the length of which approximates or exceeds the distance between said two poles to provide generally uniform radial flux leakage along a substantial circumferential length of the pole piece, a coil encircling the annular pole piece, and means pivotally supporting the coil for rotational movement along the circumferential length of the pole piece.

7. A substantially uniform wide scale electric meter movement comprising a substantially straight bar magnet, an annular pole piece having a substantial mass in relation to the magnet magnetically coupled to one pole of said magnet and lying within a plane perpendicular to the direction of polarization of the magnet at said one pole, said annular pole piece and the other pole of said magnet defining an air gap the length of which approximates or exceeds the distance between said two poles to provide generally uniform radial flux leakage along a substantial circumferential length of the pole piece, a coil encircling the annular pole piece, and means pivotally supporting the coil for rotational movement along the circumferential length of the pole piece.

8. A substantially uniform wide scale electric meter movement comprising a substantially straight bar magnet, an annular pole piece magnetically coupled to one pole of said magnet and lying within a plane perpendicular to the direction of polarization of the magnet at said one pole, said annular pole piece and the other pole of said magnet defining an air gap the length of which approximates or exceeds the distance between said two poles to provide generally uniform radial flux leakage along a substantial circumferential length of the pole piece, a coil encircling the annular pole piece, and means pivotally supporting the coil for rotational movement along the circumferential length of the pole piece.

References Cited in the file of this patent

UNITED STATES PATENTS

| | | |
|---|---|---|
| 533,107 | Weston | Jan. 29, 1895 |
| 1,548,660 | Clinker | Aug. 4, 1925 |
| 1,932,146 | Ruckelhaus | Oct. 24, 1933 |
| 2,109,953 | Bates | Mar. 1, 1938 |
| 2,515,014 | Lamb | July 11, 1950 |
| 2,537,221 | Hickok | Jan. 9, 1951 |

FOREIGN PATENTS

| | | |
|---|---|---|
| 322,333 | France | May 29, 1902 |
| 574,016 | Germany | Apr. 7, 1933 |
| 434,103 | Great Britain | May 25, 1934 |